United States Patent [19]
Briley et al.

[11] Patent Number: 4,992,623
[45] Date of Patent: Feb. 12, 1991

[54] SUPERCONDUCTING BUS BAR

[75] Inventors: Bruce E. Briley, Countryside; Mikiel L. Larson, St. Charles; John Montsma, Wheaton, all of Ill.

[73] Assignee: AT&T Bell Laboratories, Murray Hill, N.J.

[21] Appl. No.: 343,971

[22] Filed: Apr. 26, 1989

[51] Int. Cl.$^5$ ............................................. H01B 12/00
[52] U.S. Cl. ................................ 174/15.4; 174/15.5; 505/1; 505/885
[58] Field of Search .................... 174/15.4, 15.5, 125.1; 505/884, 885, 886, 887, 1

[56] References Cited

U.S. PATENT DOCUMENTS

| | | | |
|---|---|---|---|
| 3,162,716 | 12/1964 | Silver | 174/15.5 |
| 3,292,016 | 12/1966 | Kafka | 174/15.5 X |
| 3,431,347 | 3/1969 | Kafka et al. | 174/15.5 |
| 3,461,218 | 8/1969 | Buchhold | 174/15.5 |
| 3,736,365 | 5/1973 | Bobo et al. | 174/15.5 |
| 3,781,455 | 12/1973 | Hildebrandt | 174/16.2 X |
| 3,917,897 | 11/1975 | Hildebrandt | 174/15.5 |
| 3,946,141 | 3/1976 | Schmidt | 174/15.5 X |
| 4,845,308 | 7/1989 | Womack, Jr. et al. | 174/125.1 |

FOREIGN PATENT DOCUMENTS

| | | | |
|---|---|---|---|
| 1505605 | 12/1967 | France | 505/886 |
| 264815 | 11/1988 | Japan | 505/885 |
| 292519 | 11/1988 | Japan | 505/885 |

OTHER PUBLICATIONS

"Superconductor Landscape: View From Los Alamos", F. M. Mueller, Advanced Materials & Processes, vol. 133, Issue 1, Jan. 1988, pp. 79-81.

Primary Examiner—Morris H. Nimmo
Attorney, Agent, or Firm—P. Visserman; W. Ulrich

[57] ABSTRACT

An electronic system having components operating at low temperature at various locations within the system, cryogenic fluid and electrical power are distributed by means of the same conduit. In one embodiment, the conduit consists of a supply section and a return section with each section comprising a channel for conveying cryogenic fluid having superconducing walls for conveying electrical power. In another embodiment of the invention, the conduit comprises a copper rod having channels formed therein for the transport of cryogenic fluid and a channel for supporting a rod of superconducing material therein. The superconducing rod conducts electrical current to a subsystem while being cooled by cryogenic fluid in nearby channels and the cryogenic fluid is used at its destination for cooling purposes. In yet another embodiment of the invention, cryogenic fluid is transported between a source of cryogen and subsystems using the fluid, by means of a pair of concentric conduits with the walls of each conduit comprising superconducting material for simultaneously providing electrical power to the subsystems employing the cryogenic fluid.

19 Claims, 4 Drawing Sheets

FIG. 1

SUPERCONDUCTING BUS BAR

FIELD OF INVENTION

The invention pertains to the distribution of electrical power to electronic components or systems. More specifically, it pertains to an arrangement for transferring electrical power in a system having superconducting components and requiring the distribution of cryogenic liquids.

BACKGROUND OF THE INVENTION

Electronic systems such as computers and telecommunication systems employing components operating at a low temperature, such as superconductive electronic devices and optical devices, require that cryogenic fluid, (i.e. liquid nitrogen) be distributed to the various parts of the system. Such systems also require that electrical power be distributed throughout the system to each device. Typically, the power is distributed through large copper bus bars. The bus bars are made large and are made of copper to reduce power loss in the distribution system. Nevertheless, prior art power distribution systems introduce substantial power losses and generate an undesirable amount of heat. To further reduce power losses, the power is usually transmitted on the bus bar at some electrical potential (e.g. 48 volts) higher than can be accommodated by the various electronic components. This requires power conversion circuits in the proximity of the electronic devices in order to bring the voltage to the required level. Besides introducing power losses, large copper bus bars and the power conversion circuits add significantly to the cost of large electronic installations.

SUMMARY OF THE INVENTION

In accordance with this invention, these and other problems of the prior art are overcome and an advance is made over the art. Specifically, in accordance with the present invention, a power distribution system employing superconducting material and a cryogenic fluid distribution system are combined to provide both power and cryogenic fluid to each part of a system requiring both. The apparatus comprises a conduit comprising superconducting material for transmitting electrical power and a channel for transporting cryogenic fluid at a predetermined low temperature. In this unitary structure, the superconducting material is cooled by fluid flowing in the conduit to allow electrical power to be conveyed from an electrical power source to an electrical subsystem at a near zero level of electrical resistance, while cryogenic fluid is delivered to the subsystem for cooling its components. Advantageously, this arrangement eliminates the need for a separate bus bar and reduces power loss. It brings monetary savings in cost of copper, cost of power generation equipment and cost of step down power conversion equipment.

In accordance with one aspect of the invention, the conduit comprises a shell of superconducting material forming a channel for transporting cryogenic fluid. In one embodiment of the invention, the conduit consists of electrically insulated sections. One of the sections is used to deliver cryogenic fluid to an electronic subsystem while the other section is used to return cryogenic fluid to the source. Similarly, an electrical power supply is connected to one of the insulated sections to deliver electrical power to an electronic subsystem and is connected to the other of the insulated section to obtain an electrical return path from the subsystem to the power supply.

In yet another embodiment of the invention, a conduit for conveying cryogenic fluid and electrical power comprises a section of heat conducting material, such as copper rod, provided with at least one longitudinally extending passage formed therein for conveying cryogenic fluid and at least one additional passage for supporting a rod of superconductive material therein. Advantageously, the heat conducting material conducts heat from the superconducting material to the cryogenic fluid to maintain the superconducting material in its superconducting state, thereby providing a low loss power distribution system. Furthermore, while the superconducting material provides the path of least resistance in its superconducting state, the copper rod provides an alternate electrical path of limited current carrying capacity in the event that the material reverts to a nonsuperconducting state.

In yet another embodiment of the invention, a conduit for delivering cryogenic liquid and electrical power to electronic subsystems comprises a pair of concentric sleeves, each having a shell of superconducting material and forming a channel for transporting cryogenic fluid. Cryogenic fluid is delivered to a subsystem in one of the channels and is returned in the other. In an analogous fashion, one of the superconducting material shells is used as the power delivery path to a subsystem and the other shell is used as the return path.

In accordance with another aspect of the invention, a conduit for simultaneously conveying cryogenic fluid and electrical power comprises a plurality of interconnected sections, extending in the longitudinal direction. Adjacent sections are coupled by couplings of electrically conducting material electrically connected to the superconducting material for conveying electrical power across discontinuous junctions of the superconducting material.

BRIEF DESCRIPTION OF THE DRAWING

The invention may be better understood from the following detailed description when read in conjunction with the drawing in which.

DETAILED DESCRIPTION

Figure 1:
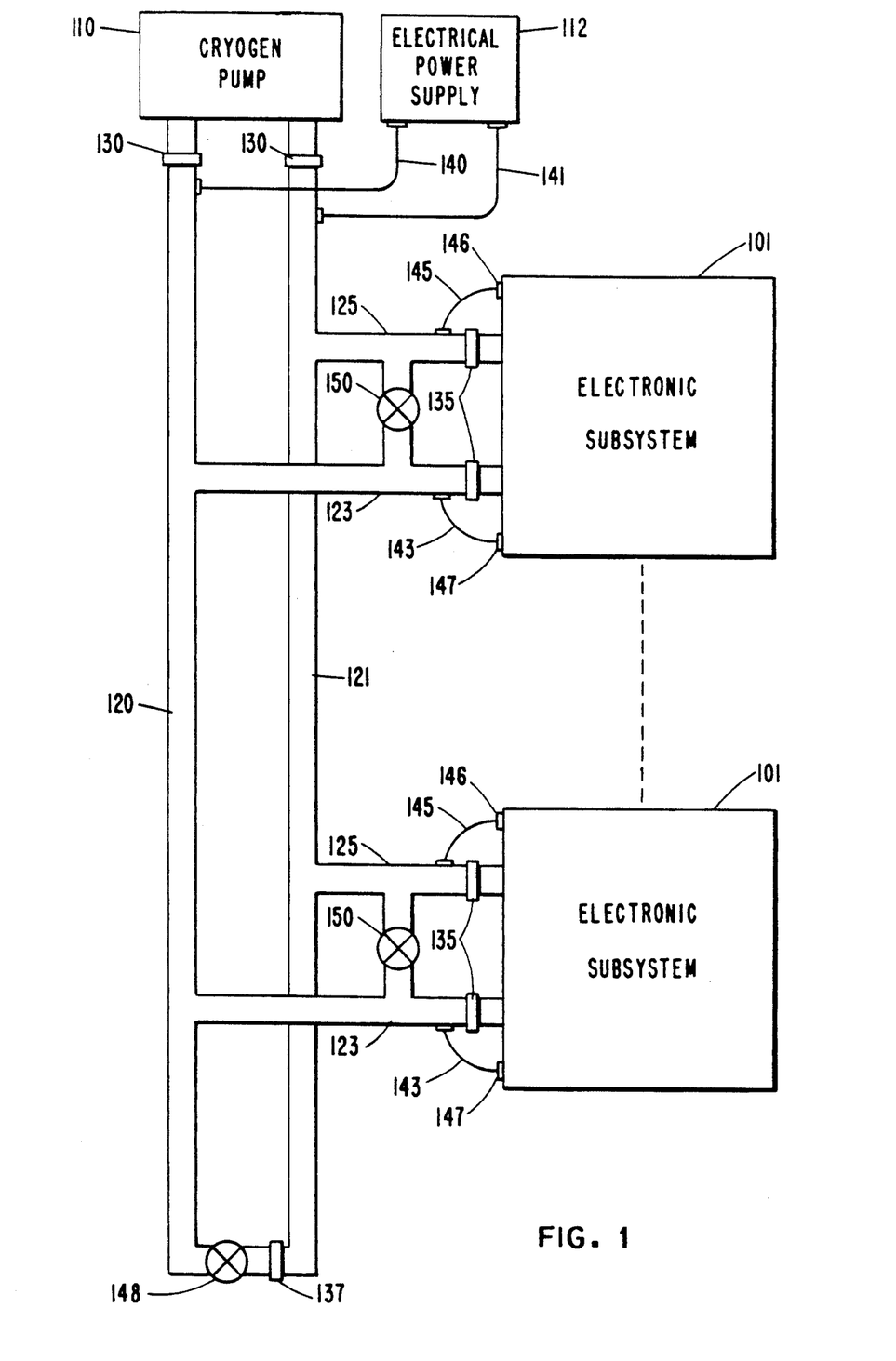
FIG. 1 is a representation of a system employing a pair of conduits for conveying cryogenic fluid and electrical power between electronic subsystems and sources of cryogenic fluid and electrical power, respectively.

FIG. 1 is a presentation of a system such as a computer or telecommunication system or the like comprising a plurality of subsystems 101, each of which requires a supply of electrical power and cryogenic cooling fluid for their components. A cryogen pump 110 is a source of cryogenic fluid for the subsystems 101, and an electrical power supply 112 is a source of electrical power for the subsystems. A conduit system consisting of two electrically insulated sections 120 and 121 provide a channel for conveying cryogenic fluid. Section 120 delivers the cryogenic fluid to the subsystems 101 by means of extensions 123, and section 121 provides a return path for the cryogenic fluid from the subsystems 101 via extensions 125. The direction of the flow of the cryogenic fluid is immaterial and the functions of the two sections may be readily reversed. Conduit sections 120 and 121 and their extensions are electrically insulated from the cryogen pump 110 by insulating sections 130, from the subsystems 101 by insulating sections 135, and from each other by insulating section 137. A power transmission path between power supply 112 and electrical terminals 146 and 147 of the subsystems is formed by conductors extending across insulating sections. Electrical wire 140 connects one terminal of the power supply 112 to section 120, and wire 141 connects the other terminal of the power supply 112 to section 121. Wires 143 connect the electrical terminals 147 of subsystems 101 to extensions 123 of section 120 and wires 145 connect electrical terminals 146 of the subsystems 101 to extensions 125 of section 121. The insulators 130, 135 and 137 may, for example be made of KAPTON, a commercially available insulating material. The insulators are inserted in the conduits so as to allow free flow of the cryogenic fluid through the conduits, but providing electrical insulation for the electrically conductive parts. In this illustrative embodiment, the cryogenic fluid is nitrogen ($N_2$), which is not an electrical conductor and hence does not conduct electrical current between the two sections. Other cryogenic fluid with similar properties may be used as well.

The cryogen pump 110, is a commercially available pump unit which includes a refrigeration unit to cool returned cryogenic fluid and a supply of the cryogenic fluid sufficient to provide cooling to the subsystems 110 at the required temperature and to keep the superconductive materials in the conduit, particularly in the fluid return conduit, below their critical temperature. Similarly, the electrical power supply 112 may be a commercially available unit capable of providing the power required by subsystems 101. Not shown on the drawing are the valves normally incorporated in the conduit to facilitate disconnection of the conduit from the various parts of the system. Bypass valves 150 are included to allow fluid flow to bypass the subsystems 101, are shown in FIG. 1. In this illustrative embodiment, a certain amount of bypass is desirable to maintain the fluid in the return conduit at sufficiently low temperature to provide proper cooling for superconductive electrical path in the fluid return conduit. To assure a sufficient pressure differential between the supply conduit 120 and the return conduit 121 to provide the desirable flow through the electronic subsystems 101, a flow restriction in the form of valve 148 is used at the junction of the two conduit sections 120 and 121. Alternatively, the two sections may each be closed-ended rather than joined as shown in FIG. 1. Joining the two sections with a flow restricting valve provides an adjustable means for controlling the fluid flow, and hence temperature of the superconductor in the return conduit section.

Figure 2:
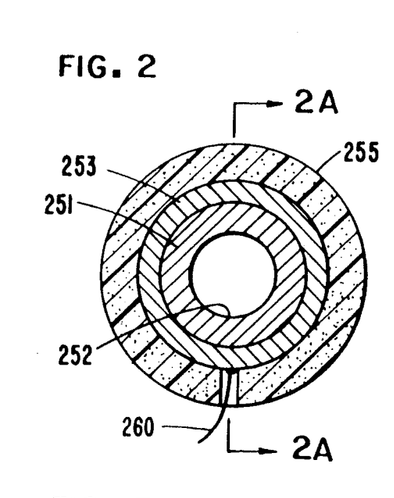
FIG. 2 represents a cross-section of a conduit of the system of FIG. 1 having a superconductive shell and a channel for conducting cryogenic fluid.

FIG. 2 is a cross-section of one embodiment of a conduit for conducting cryogenic fluid and electrical power in the arrangement of FIG. 1. The conduit comprises a shell 251 consisting of super-conducting material, which may be the commercially available material sometimes referred to as 1-2-3 ceramic material ($Y_1Ba_2Cu_3O_7$). The cryogenic fluid flows within the channel 252 formed by the superconducting shell. The interior and exterior surfaces of the shell may be coated with a suitable pacifying material, for example a thin silver coating or indium plating to reduce erosion of the shell and to enhance electrical conductivity with adjacent surfaces. The appropriate size of the channel for the cryogenic fluid will depend on the amount of power dissipated by the system being cooled and the pressure exerted by the pump. The cannel 252 may, for example, be on the order of 5 cm in diameter in a system where the power dissipation is on the order of 10 kilowatts. The thickness of the superconductive shell 251 in this embodiment is approximately 1.5 cm thick. This thickness depends on the physical properties of the material used as well as its current carying capacity. With currently available materials, a thickness on the order of at least 1.5 cm is recommended to provide the necessary physical strength. A shell of this thickness of 1-2-3 material will provide the required current carrying capability in 5-volt system in which 10 kilowatts of power is dissipated and the temperature of the cryogenic fluid is at or near that of liquid nitrogen, i.e. 77 degrees Kelvin. Surrounding the superconductive shell is a copper support shell 253. The thickness of the shell is on the order of 0.3 cm. The copper shell provides support for the superconductive shell and also provides an electrical shunt in the event that the system temperature rises above the critical temperature of the superconductive material and the material becomes essentially nonconductive. An outer shell 255 consisting of appropriate insulating material which is commercially available, provides thermal insulation for the conduit. The thickness of the shell depends upon the material chosen and the amount of heat transfer which is deemed to be acceptable in the system. A further shell (not shown in the figure) consisting of a vacuum chamber may be installed between the copper tubing and the insulating material to further reduce the heat transfer. An electrical connection to the conduit is established via a connecting terminal 260 which is electrically connected to the superconductive shell 251 via the copper support shell 253.

Figure 2A:
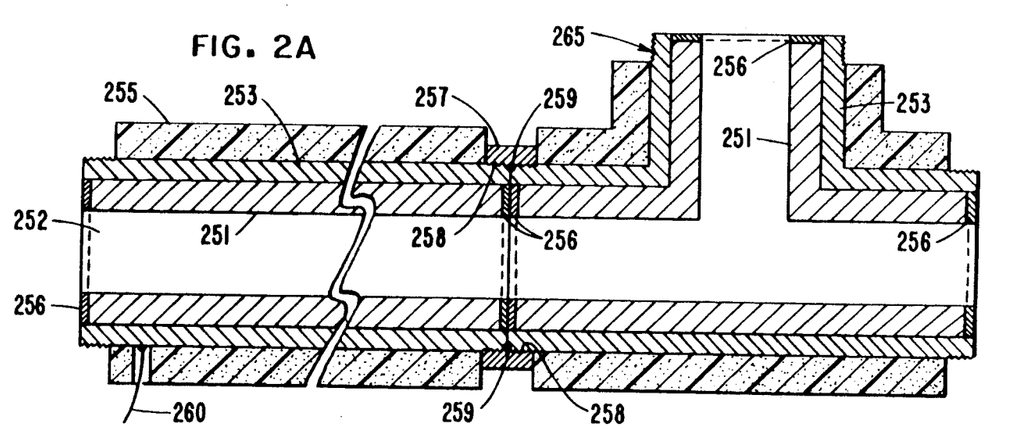
FIG. 2A is a cross-sectional view along line 2A—2A of the conduit of FIG. 2.

FIG. 2A is a cross-sectional view of the conduit along line 2A—2A of FIG. 2 and further shows a threaded coupler 257, preferably made of copper or other material of high electrical conductivity. The coupler 257 engages threaded portions 258 of the two adjacent conduit sections to provide mechanical coupling. A seal 259 made of rubber or the like prevents leakage of the cryogenic fluid. Copper washers 256 are added to enhance electrical conductivity across the junction. The washers 256 are dimensioned so as to be forced in contac with the superconducting shells 251, the copper shell 253 and each other when the coupler 257 is tightened. The coefficient of expansion of the copper shell 253 is preferably chosen to be somewhat greater than that of the superconducting shell 251 to encourage greater electrical contact between the two shells at cold temperature. The contact between the superconducting shell 251 and the copper shell 253 assure electrical conductivity across the junction by means of the threaded copper coupler 257. By choosing a copper alloy for the couple 257 which has a higher coefficient of expansion than the shell 253, a tighter contact will be formed when the system is at cold temperatures.

A T section for connection, for example, to extensions 123 and 125 may be formed as shown in FIG. 2A at 265. The T section may be a separate section attached to a straight section of the conduit by means of coupler 257, as described above. The copper conduit shell of the T section may be formed in a well known manner, for example, by providing intersection sections with threaded portions to provide desirable electrical contact.

Figures 3, 3A:
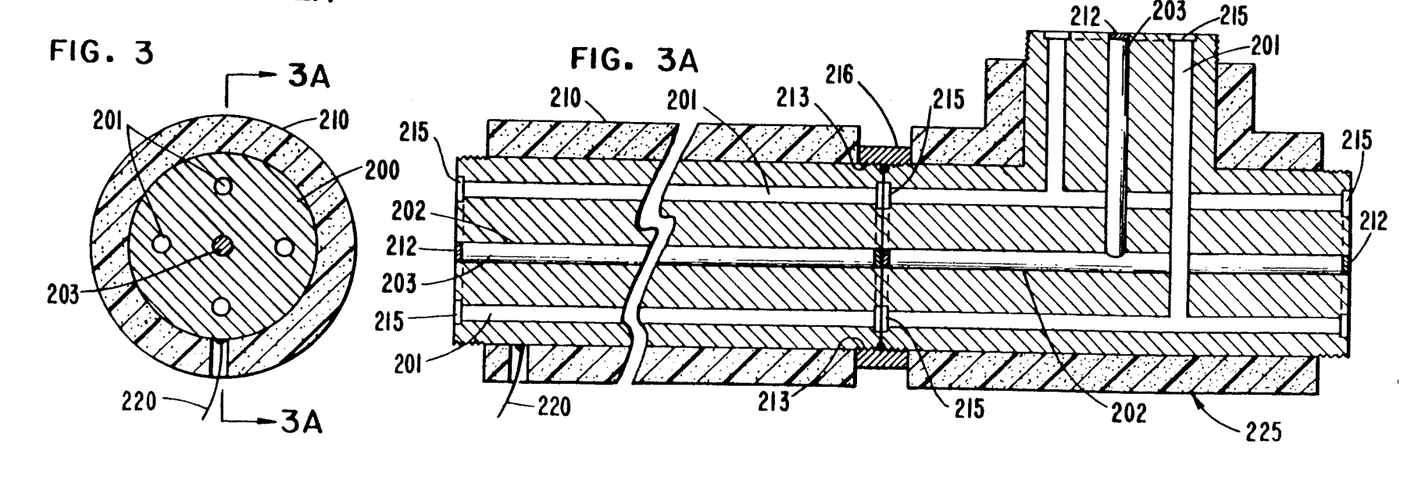
FIG. 3 represents a cross-section of an alternative conduit configuration for the system of FIG. 1, comprising a copper rod having channels formed therein for conveying cryogenic fluid and a channel for supporting a rod of superconductive material.
FIG. 3A is a cross-sectional view along line 3A—3A of the conduit of FIG. 3.

FIG. 3 is a cross-section of an alternative configuration of a conduit for use in the system of FIG. 1. The conduit of FIG. 3 consists of a copper rod 200 having formed therein a plurality of channels 201 for conducting cryogenic fluid and a channel 202 extending along the center line of the copper rod 200, for supporting a rod 203 consisting of superconducting material. The copper rod 200 is surrounded by a jacket of thermal insulation 210 which may consist of suitable thermal insulating material or a combination of a vacuum chamber (not shown) and insulating material to provide the desired insulation. An electrical connection is made to the superconducting rod 203 via the copper rod 200 and electrical terminal 220. The superconducting rod may be of approximately 1.25 cm in diameter and the channel for receiving the superconducting rod will have a diameter slightly larger to allow the superconducting rod to be inserted therein. The channels 201 for conducting the cryogenic fluid also have a diameter of 1.25 cm and the copper rod 200 has a diameter of 8.75 cm. At each end of the superconducting rod 203, a copper insert 212, as shown in FIG. 3A, machined to make contact with the superconducting rod 203 and the sides of channel 202, is inserted in the channel 202 to assure electrical contact between the superconducting rod 203 and the copper rod 200. This allows electrical current to flow through the copper rod to terminal 220 and across the joint of two sections of conduit. Since the coefficient of expansion of copper is greater than that of the 1-2-3 ceramic material ($Y_1Ba_2Cu_3O_7$), further contact will be made between the superconducting rod and the channel walls at cold temperatures if the room temperature channel diameter is close to that of the superconducting rod.

A threaded copper coupler 216 shown in FIG. 3A is used to join two sections of the conduit and provides the electrical conductive path between the sections by making electrical contacts via the threaded sections 213 of the adjoining copper rods. By choosing a copper alloy for the coupler which has a somewhat higher coefficient of expansion than the copper rod, a closer contact between the copper rods may be obtained when the system is at cold temperature, thereby further enhancing the conductivity across the joint. It is also noted that the resistance of copper at the temperature of liquid nitrogen, for example, is on the order of 1/6 that of its resistance at room temperature, further enhancing the electrical conductivity of the copper at the joints. To facilitate the flow of cryogenic fluids through the channels 201 when the channels of adjoining sections may not be fully aligned, a recessed area 215 is machined in the end of the copper rod 200 to allow fluid flow between the channels 201.

A T section for the conduit is shown at 225. The T section may be a separate section attached to a straight section of the conduit by coupler 216, as described above. The T section may be formed as a solid copper section having intersecting channels formed therein to provide for the flow of cryogenic fluid and to support intersecting superconducting rods. Alternatively, superconducting rods may be eliminated from the T section since the copper body of the T section will present a relatively small resistance over a comparatively short distance.

Figure 4:
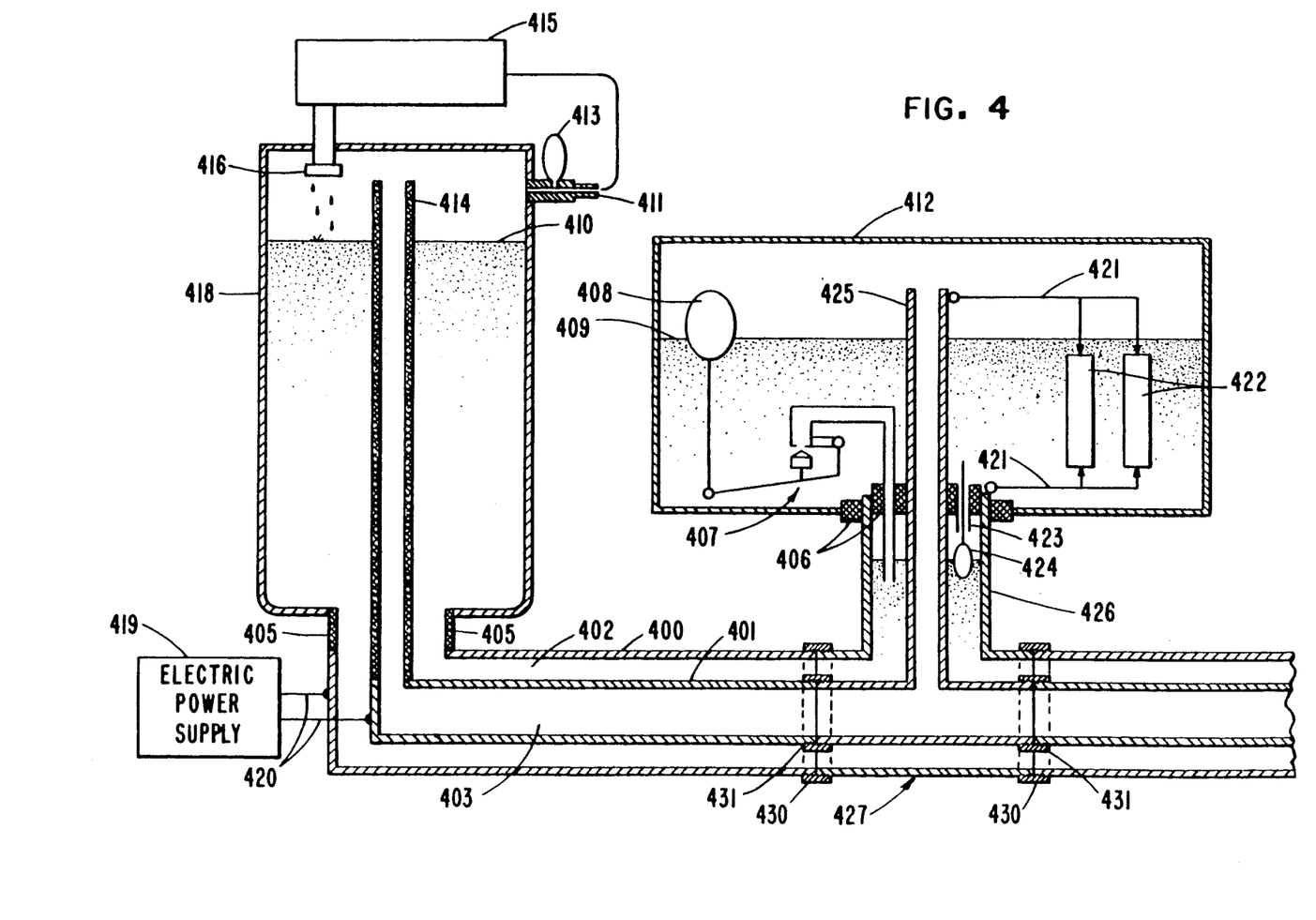
FIG. 4 is a cross-sectional representation of a source of cryogenic fluid and concentric conduits for simultaneously conveying cryogenic fluid and electrical power between electronic subsystems and cryogenic fluid and electrical power sources, respectively.

FIG. 4 shows a gravity feed cryogenic fluid supply and distribution arrangement for use in the system such as depicted in FIG. 1. This arrangement uses a set of concentric conduits 402, 403 instead of two insulated sections as shown in FIG. 1, for conveying both cooling fluid and electrical current to and from a subsystem 412. In this arrangement, the cryogenic fluid is delivered from the source in liquid form and is returned in gaseous form to which it is converted by absorbing heat from the subsystem. A supply of cryogenic fluid is maintained in a reservoir 418 at a level 410 which is physically higher than the level 409 of cryogenic fluid in the subsystem housing 412, causing gravitational flow to the subsystem. A level control float 408 operates a valve 407 to regulate the level within the electronic subsystem. The cooling liquid, which may be liquid nitrogen, is transported in the outer channel 402 of the concentric conduit and is supplied to the subsystem. Electronic, optical or superconducting component assemblies 422 are submerged in the liquid in the subsystem and during normal operations will transfer heat to the liquid causing some of the liquid to be transformed to the vapor state. A standpipe 425 in the subsystem, extending above the level of the cryogenic liquid in the subsystem, communicates via the inner concentric channel 403 with standpipe 414 in the reservoir 418. As gas is generated in the subsystem housing 412 and its pressure increases, gaseous nitrogen will flow through standpipes 425 and 414 and inner concentric channel 403 into reservoir 418, causing increased gas pressure there. A pressure sensor 411 is used to signal a refrigeration unit 415 of the gas pressure in the reservoir. When the pressure exceeds a certain level, the refrigeration unit 415 cools a condenser 416 which causes the gaseous cryogenic fluid to be condensed to the liquid form, thereby replenishing the liquid in the reservoir. A pressure relief valve 413 is provided to avoid excess gas pressure in the system.

Walls 401 of the inner channel 403 and wall 400 of the outer channel 402 consist of electrically conducting material. Specifically, they comprise a superconducting material such as the aforementioned 1-2-3 material ($Y_1Ba_2Cu_3O_7$) supported by a copper shell, as will be discussed in greter detail below with respect to FIG. 5. The walls of the standpipe 425 and the T section extension 427 are made of the same material. A cryogen, e.g. nitrogen ($N_2$), is used which is not an electrical conductor. Electrical power is transmitted from the electrical power supply 419 via conductors 420 and 421 to component assemblies 422, with the wall 400 of the outer concentric conduit serving as one path and the wall 401 of the inner concentric conduit serving as the return path. A section of insulating material 405 provides insulation between the housing of the reservoir 418 and superconducting wall 401. The standpipe 414 may be made of insulating material or conducting material. Electrical insulators 406 are provided between the housing of subsystem 412 and the outer superconducting wall 426 of the T section extension 427, and between the standpipe 425 and the outer shell 426 of extension 427. Copper couplers 430 and 431 provide a way of attaching the extension section 427 to the remainder of the concentric conduit. To allow for the escape of gas which may build upon the cryogenic liquid in channel 402, a vent 423 is provided. A float valve 424 prevents liquid from flowing through the vent.

Figure 5:
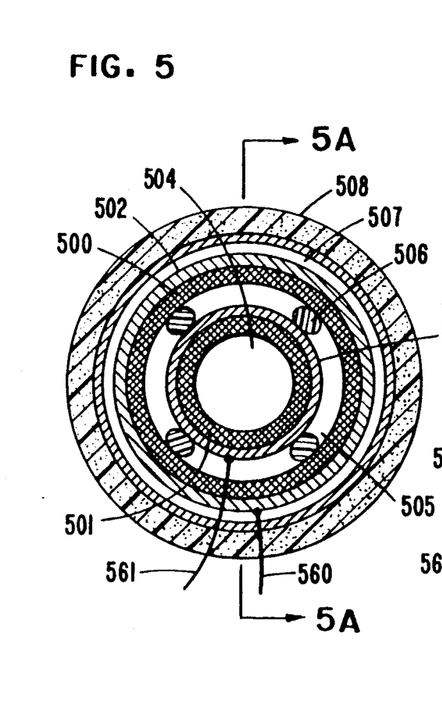
FIG. 5 represents a cross-section of a conduit for use in the system of FIG. 4, consisting of concentric superconducting shells forming channels for conveying cryogenic fluid.
Figure 5A:
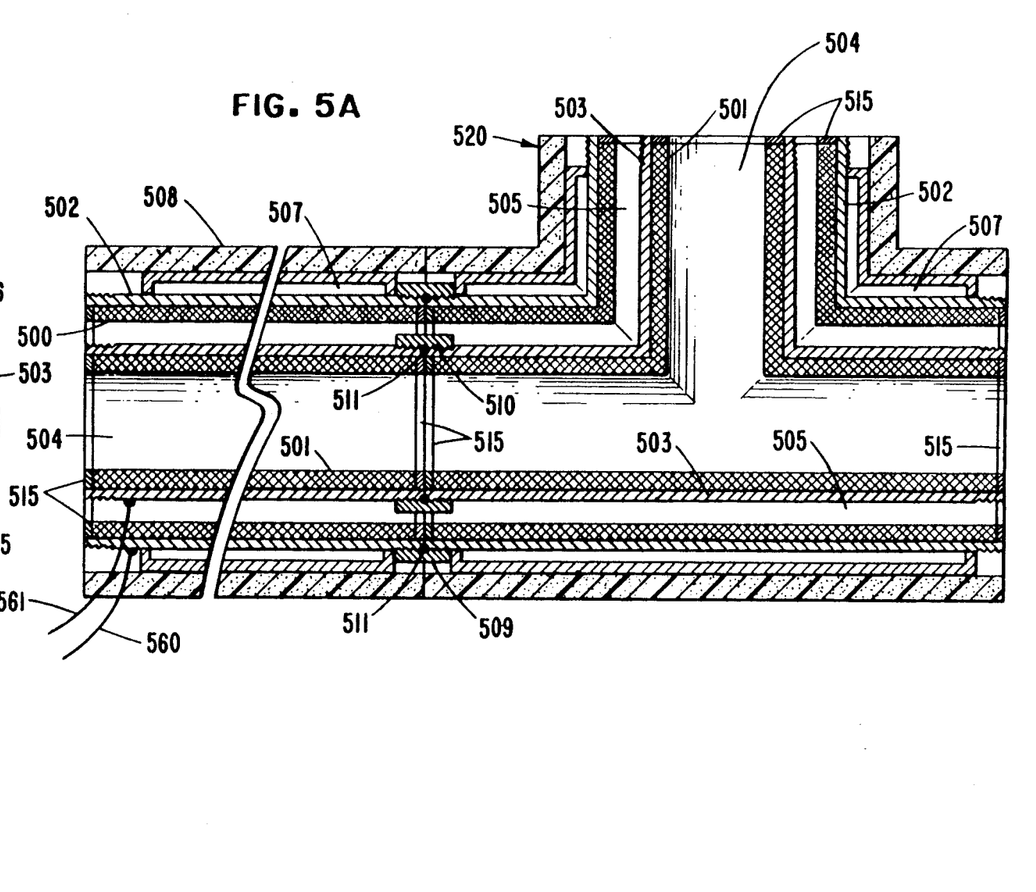
FIG. 5A is a cross-sectional view along line 5A—5A of the conduit of FIG. 5.

FIG. 5 shows in greater detail the concentric conduit of FIG. 4. FIG. 5 shows an inner channel 504 used for the transport of gaseous cryogen. In a system in which 10 kilowatts of power is dissipated, the diameter of this passage has been chosen to be approximately 9 cm. The passage 504 is surrounded by a shell 501 of the aforementioned 1-2-3 superconducting material. The thickness of this shell in this illustrative embodiment is approximately 1.25 cm. The interior and exterior surfaces of the shell may be coated with a suitable pacifying material as mentioned earlier, such as silver or indium. To lend structural support and to provide a convenient way of conducting current cross joints where sections of the concentric conduit are joined together, the inner shell of superconducting material is surrounded by a copper shell 503 having a wall thickness of approximately 0.3 cm. The liquid cryogen is transported in the space 505 between the concentric shells. The distance between the outer wall of the inner shell 503 and the inner wall of the outer shell 500 was chosen to be approximately 0.6 cm. The outer conduit consist of a shell of superconducting material 500 having a thickness of approximately 1.25 cm and surrounded by a copper support shell 502 of approximately 0.3 cm thickness. A vacuum chamber 507, shown in FIG. 5A, surrounds the outer wall of the concentric conduit to provide heat insulation. A further layer of insulating material 508 provides additional insulation. Electrically insulating spacers 506 are provided to support the inner conduit within the outer conduit. Threaded copper couplers 509 and 510 shown in FIG. 5A, are used to provide mechanical coupling and electrical conduction paths. Coupler 509 couples sections of the outer copper shell 502 and coupler 510 couples sections of the inner copper shell 503. A seal 511 is used to prevent fluid passage between the two channels at the junctions. Copper rings 515 at the end of each section of concentric conduit aid in establishing electrical contact between the superconducting shells and the surrounding copper sleeve. Electrical conductivity across conduit junctions is provided through the copper sleeves and the couplings 509 and 510. By making the copper sleeve only slightly larger than the superconducting material which it covers, additional contact between the copper sleeve and the superconducting material will be attained at cold temperatures due to the difference in coefficient of expansion between the two materials.

A T connection for the concentric conduit is shown at 520. The T section may be formed in a well known manner. The intersecting inner conduit may, for example, be provided with threaded portions to provide mechanical and electrical coupling. If desired, the superconducting shells may be omitted from the T section, since the corresponding copper shells will conduct currrent at a relatively low resistance over the relatively short distance of the T section.

It is to be understood that the above-described apparatus for providing cooling fluid and electrical power to one or more subsystems is merely an illustrative embodiment of the principles of this invention and specific dimensions and other data are provided only for the purpose of illustrating the invention. Other apparatus may be readily devised by those skilled in the art without departing from the spirit and scope of our invention.

We claim:

1. Apparatus for simultaneously supplying cryogenic fluid and electrical power comprising a conduit arrangement comprising conduit sections, each comprising superconducting material for conducting electrical power to an electrical subsystem and a channel for transporting cryogenic fluid at a predetermined low temperature to cool said superconductive material to conduct electrical power at or near zero level of electrical resistance, and further comprising a channel arrangement for transporting cryogenic fluid from said conduit arrangement to said electrical subsystem to cool said electrical subsystem.

2. Apparatus in accordance with claim 1 wherein said channel for transporting cryogenic fluid is constructed of superconductive material.

3. Apparatus for simultaneously supplying cryogenic fluid and electrical power in accordance with claim 1, wherein said conduit arrangement comprises first and second conduit sections, each section comprising a channel formed by a shell consisting essentially of superconducting material, said channel of said first section for transferring cryogenic fluid from a cryogenic fluid source to an electrical subsystem via said channel arrangement and said channel of said second section for transferring cryogenic fluid from said subsystem to said cryogenic fluid source via said channel arrangement, said shell of one of said first and said second sections for providing an electrical current path from an electrical power source to said subsystem, and said shell of the other of said first and said second sections for providing an electrical current return path from said subsystem to said electrical power source.

4. Apparatus in accordance with claim 2 wherein said channel comprises rigid superconductive material.

5. Apparatus for simultaneously supplying cryogenic fluid and electrical power in accordance with claim 1, wherein said conduit arrangement comprises two section of heat conducting material each having a longitudinal axis and each having at least one passage formed therein extending in the longitudinal direction of said section of heat conducting material for conveying cryogenic fluid or gas and at least one additional passage formed therein extending in the longitudinal direction for supporting an elongated member of superconductive material therein, said elongated member of superconductive material for conductive electrical current while maintained at a superconducting temperature by the conduction of heat from said elongated member through said heat conducting material to cryogenic fluid or gas flowing in said at least one passage for conveying cryogenic fluid or gas, said cryogenic fluid flowing away from a source in one of said sections and toward said source in the other of said sections.

6. Apparatus for simultaneously supplying cryogenic fluid and electrical power comprising a conduit arrangement comprising conduit sections, each comprising superconducting material for conducting electrical power to an electrical subsystem and a channel for transporting cryogenic fluid to said electrical subsystem at a predetermined low temperature to cool said superconductive material to conduct electrical power at or near zero level of electrical resistance and to cool said electrical subsystem;

wherein said conduit arrangement comprises first and second conduit sections, each section comprising a channel formed by a shell consisting essentially of superconducting material, said channel of said first section for transferring cryogenic fluid from a cryogenic fluid source to an electrical subsystem and said channel of said second section for transferring cryogenic fluid from said subsystem to said cryogenic fluid source, said shell of one of said first and said second sections for providing an electrical current path from an electrical power source to said subsystem, and said shell of the other of said first and said second sections for providing an electrical current return path from said subsystem to said electrical power source;

wherein said first and said second sections are joined at a junction of one end of each said section to form a continuous channel for fluid from one fluid connection point of a cryogenic fluid source to another fluid connection point of said cryogenic fluid source and said shells of said first and said second sections are electrically isolated from each other at said junction to provide electrically independent paths between an electrical power source and said subsystem.

7. Apparatus in accordance with claim 6, further comprising insulator means for providing electrical insulation between each of said sections and said subsystem and between each of said sections and said source of cryogenic fluid, and electrical connection means for establishing electrical connections between said shells of said first and said second sections and said electrical power source and between said shells of said first and said second sections and said electrical subsystem.

8. Apparatus for simultaneously supplying cryogenic fluid and electrical power comprising a conduit arrangement comprising conduit sections, each comprising superconducting material for conducting electrical power to an electrical subsystem and a channel for transporting cryogenic fluid to said electrical subsystem at a predetermined low temperature to cool said superconductive material to conduct electrical power at or near zero level of electrical resistance and to cool said electrical subsystem;

wherein said conduit arrangement comprises a section of heat conducting material having a longitudinal axis and having at least one passage formed therein extending in the longitudinal direction of said section of heat conducting material for conveying cryogenic fluid and at least one additional passage formed therein extending in the longitudinal direction for supporting an elongated member of superconductive material therein, said elongated member of superconductive material for conducting electrical current while maintained at a superconducting temperature by the conducting of heat from said elongated member through said heat conducting material to cryogenic fluid flowing in said at least one passage for conveying cryogenic fluid;

wherein said heat conducting material is copper, said elongated member of superconducting material being in electrical contact with said copper, whereby said copper forms a path for conducting electrical power in said conduit in the event that said superconducting material loses its superconducting properties.

9. Apparatus for simultaneously supplying cryogenic fluid and electrical power comprising a conduit arrangement comprising conduit sections, each comprising superconducting material for conducting electrical power to an electrical subsystem and a channel for transporting cryogenic fluid to said electrical subsystem at a predetermined low temperature to cool said superconductive material to conduct electrical power at or near zero level of electrical resistance and to cool said electrical subsystem;

further comprising a source of cryogenic fluid comprising a fluid inlet and a fluid outlet and an electrical power source having an electrical input and an electrical output terminal;

said conduit arrangement comprising a first conduit section comprising a conduit wall consisting essentially of superconducting material to form a channel in communication with said fluid outlet of said source of cryogenic fluid and a second conduit section extending within said channel of said first conduit section and comprising a conduit wall consisting essentially of superconducting material to form a channel in communication with said fluid inlet of said source of cryogenic fluid;

said apparatus further comprising means for connecting said electrical input terminal to said wall of one of said first and said second conduits and for connecting said electrical output terminal to said wall of the other of said first and said second conduits.

10. The apparatus in accordance with claim 9, wherein said source of cryogenic fluid comprises a fluid reservoir, and wherein said fluid outlet is positioned in a lower portion of said reservoir for providing cryogenic fluid in liquid form to said channel of said first conduit section and said fluid inlet comprises a conduit extension extending to an upper portion of said reservoir for receiving cryogenic fluid in vapor form.

11. A superconducting power distribution and cryogenic fluid distribution apparatus comprising a fluid conduit consisting of superconducting material having openings for receiving and discharging cryogenic fluid, and means for making electrical connections from a source of electrical power to said superconducting material, said conduit for distributing electrical power from said source to at least one electrical subsystem and further comprising a channel arrangement for transporting cryogenic fluid from said conduit arrangement to said electrical subsystem to cool said electrical subsystem.

12. A conduit for conducting a flow of cryogenic fluid from a source of cryogenic fluid to a sink of cryogenic fluid, said conduit consisting of two electrically insulated sections, each section having walls consisting of electrically superconducting material and each section having means for making electrical connections to said walls of superconducting material and for providing cryogenic fluid to an electrical subsystem, wherein the first section comprise means for connection to a channel for providing cryogenic fluid from said section to said subsystem, and said second section comprises means for connection to a channel for accepting cryogenic fluid from said subsystem.

13. Apparatus including a cryogenic fluid conducting vessel and a dual electrical power distribution apparatus, comprising a first fluid conduit formed by a shell consisting essentially of superconducting material for conducting fluid flow in a first direction and a second fluid conduit formed by a shell consisting essentially of superconducting material for conducting fluid flow in a second direction, and means for making electrical connections to said first and said second conduits for connecting a plurality of electrical devices to said first and said second conduits, and means for providing cryogenic fluid from said conduits to ones of said plurality of electrical devices for cooling said ones of said devices, the first conduit comprises means for connection to a channel for providing cryogenic fluid from said conduit to said ones of said plurality of electrical devices, and said second conduit comprises means for connection to a channel for accepting cryogenic fluid from said ones of said plurality of electrical devices whereby said shells of said first and said second conduits and said ones of said plurality of electrical devices are cooled when cryogenic fluid is flowing in said conduits to provide two electrically conducting paths between said ones of said plurality of electrical devices connected thereto.

14. The apparatus in accordance with claim 13 wherein said first and said second fluid conduits comprise a plurality of interconnected longitudinally extending shell sections and coupling means comprising electrically conducting material and electrically connected to said shell sections for conveying electrical power across junctions of said shell sections.

15. Apparatus including a cryogenic fluid conducting vessel and a dual electrical power distribution apparatus, comprising a first fluid conduit formed by a shell consisting essentially of superconducting material for conducting fluid flow in a first direction and a second fluid conduit formed by a shell consisting essentially of superconducting material for conducting fluid flow in a second direction, and means for making electrical connections to said first and said second conduits for connecting a plurality of electrical devices to said first and said second conduits, and means for providing cryogenic fluid from said conduits to ones of said plurality of electrical devices for cooling said ones of said devices whereby said shells of said first and said second conduits are cooled when cryogenic fluid is flowing in said conduits to provide two electrically conducting paths between electrical devices connected thereto;
   wherein said first and said second fluid conduits comprise a plurality of interconnected longitudinally extending shell sections and coupling means comprising electrically conducting material and electrically connected to said shell sections for conveying electrical power across junctions of said shell sections;
   wherein said coupling means comprises threaded screw couplers having a coefficient of expansion greater than the coefficient of expansion of said shell sections whereby said couplers act to force said sections closer together as said sections are cooled.

16. Apparatus for simultaneously supplying cryogenic fluid and electrical power comprising a conduit arrangement comprising conduit sections, each comprising superconducting material for conducting electrical power to an electrical subsystem and a channel for transporting cryogenic fluid to said electrical subsystem at a predetermined low temperature to cool said superconductive material to conduct electrical power at or near zero level of electrical resistance and to cool said electrical subsystem;
   wherein said conduit comprises a pair of concentric conduits each having a fluid conducting channel formed by a channel wall comprising superconductive material, each conduit of said pair of conduits fo connection to a source of cryogenic fluid and a source of electrical power and for connection to an electrical system requiring cryogenic fluid and electrical power, one conduit of said pair of conduits for conveying cryogenic fluid and electrical current from said sources to said system and the other conduit of said pair of conduits for providing a return path for cryogenic material and said current from said system to said sources, said return path for conveying said cryogenic material in a liquid or a gaseous state.

17. Apparatus for simultaneously supplying cryogenic fluid and electrical power comprising a conduit arrangement comprising conduit sections, each comprising superconducting material for conducting electrical power to an electrical subsystem and a channel for transporting cryogenic fluid to said electrical subsystem at a predetermined low temperature to cool said superconductive material to conduct electrical power at or near zero level of electrical resistance and to cool said electrical subsystem;
   wherein said channel for transporting cryogenic fluid is constructed of superconductive material;
   wherein said channel comprises rigid superconductive material; and wherein said rigid superconductive material comprises ceramic material.

18. Apparatus for simultaneously supplying cryogenic fluid and electrical power comprising a conduit, said conduit comprising conducting material for conducting electrical power to an electrical subsystem at a low level of electrical resistance and a channel for transporting cryogenic fluid to said electrical subsystem at a predetermined low temperature to cool said electrical subsystem and said conducting material, and further comprising a channel arrangement for transporting cryogenic fluid from said conduit arrangement to said electrical subsystem to cool said electrical subsystem.

19. The apparatus of claim 18 wherein said conduit further comprises superconductive material electrically connected to said conducting material for conducting said electrical power to said electrical subsystem, whereby said superconducting material conduct said electrical power when said superconducting material is in the superconductive state, and said conducting material conducts said electrical power when said superconductive material goes out of the superconductive state.

* * * * *

UNITED STATES PATENT AND TRADEMARK OFFICE
CERTIFICATE OF CORRECTION

PATENT NO. : 4,992,623

DATED : February 12, 1991

INVENTOR(S) : Bruce E. Briley, Mikiel L. Larson, John Montsma

It is certified that error appears in the above-identified patent and that said Letters Patent is hereby corrected as shown below:

Claim 5, column 8, line 59, delete the second occurrence of "conductive" and substitute --conducting--.

Claim 8, column 9, line 64, delete the second occurrence of "conducting" and substitute --conduction--.

Claim 12, column 10, line 66, delete "comprise" and substitute --comprises--.

Claim 15, column 11, line 63, after "sections" insert a comma.

Claim 19, column 12, line 58, delete "conduct" and substitute --conducts--.

Signed and Sealed this

First Day of September, 1992

Attest:

DOUGLAS B. COMER

Attesting Officer

Acting Commissioner of Patents and Trademarks